US011607078B2

(12) United States Patent
Becker et al.

(10) Patent No.: US 11,607,078 B2
(45) Date of Patent: Mar. 21, 2023

(54) COOKING APPLIANCE WITH PROGRAMMABLE ZONE PROFILES

(71) Applicant: Channel Products, Inc., Solon, OH (US)

(72) Inventors: James S. Becker, Chardon, OH (US); Russell K. Myers, Hudson, OH (US)

(73) Assignee: Channel Products, Inc., Solon, OH (US)

( * ) Notice: Subject to any disclaimer, the term of this patent is extended or adjusted under 35 U.S.C. 154(b) by 983 days.

(21) Appl. No.: 16/272,414

(22) Filed: Feb. 11, 2019

(65) Prior Publication Data
US 2019/0246837 A1     Aug. 15, 2019

Related U.S. Application Data

(60) Provisional application No. 62/628,569, filed on Feb. 9, 2018.

(51) Int. Cl.
*G01K 13/00* (2021.01)
*A47J 37/07* (2006.01)
(Continued)

(52) U.S. Cl.
CPC .......... *A47J 37/0704* (2013.01); *A47J 36/32* (2013.01); *A47J 37/07* (2013.01); *F23N 1/002* (2013.01);
(Continued)

(58) Field of Classification Search
CPC ........ A47J 37/0704; A47J 36/32; A47J 37/07; F23N 1/002; F23N 5/022; F23N 5/102;
(Continued)

(56) References Cited

U.S. PATENT DOCUMENTS

| | | | | |
|---|---|---|---|---|
| 5,413,164 A | * | 5/1995 | Teshima | B23K 1/008 |
| | | | | 165/206 |
| 5,548,201 A | * | 8/1996 | Grabon | H02J 7/0091 |
| | | | | 320/150 |
| RE35,554 E | * | 7/1997 | Pompei | G01J 5/03 |
| | | | | 374/128 |

(Continued)

FOREIGN PATENT DOCUMENTS

| | | | |
|---|---|---|---|
| CN | 103954837 B | * | 11/2016 |
| CN | 109744856 B | * | 6/2021 |

(Continued)

OTHER PUBLICATIONS

PCT International Search Report and Written Opinion from International Application No. PCT/US2019/017493, dated Apr. 12, 2019, 12 pages.

*Primary Examiner* — Gail Kaplan Verbitsky
(74) *Attorney, Agent, or Firm* — Tucker Ellis LLP; Michael G. Craig; Heather M. Barnes (57) ABSTRACT

A temperature display and/or control system is disclosed for a cooing apparatus, such as a grill, comprising a plurality of individual zones to provide individual zone temperatures. Each zone of the grill is associated with a temperature sensor, such as a thermocouple, and a visual indicator to indicate the zone temperature, such as control knob bearing a multi-color LED. A controller obtains a signal from the temperature sensor indicating a raw temperature and converts the raw temperature to an actual zone temperature based on a temperature profile selected for the zone. The temperature profile is configurable for each zone based on a configuration of the zone in order to maintain an accurate temperature conversion despite alterations to an environment.

20 Claims, 5 Drawing Sheets

(51) Int. Cl.
*G01K 7/02* (2021.01)
*A47J 36/32* (2006.01)
*F23N 1/00* (2006.01)
*G05D 23/19* (2006.01)
*F23N 5/02* (2006.01)
*F23N 5/10* (2006.01)
*G05D 23/22* (2006.01)

(52) U.S. Cl.
CPC ............ *F23N 5/022* (2013.01); *F23N 5/102* (2013.01); *G01K 7/021* (2013.01); *G01K 13/00* (2013.01); *G05D 23/1934* (2013.01); *G05D 23/22* (2013.01); *F23N 2225/08* (2020.01); *F23N 2237/02* (2020.01)

(58) Field of Classification Search
CPC ............ F23N 2225/08; F23N 2237/02; G01K 7/021; G01K 13/00; G05D 23/1934
See application file for complete search history.

(56) References Cited

U.S. PATENT DOCUMENTS

| | | | |
|---|---|---|---|
| 6,559,427 B1* | 5/2003 | Barnes | F24C 7/082 |
| | | | 219/486 |
| 7,798,139 B2* | 9/2010 | Gagas | A47J 37/0704 |
| | | | 126/39 BA |
| 2007/0084853 A1* | 4/2007 | Shingler | H05B 3/70 |
| | | | 219/452.11 |
| 2007/0221655 A1* | 9/2007 | Bridgwater | A47J 37/0871 |
| | | | 219/494 |
| 2009/0183729 A1* | 7/2009 | Barkhouse | G05D 23/22 |
| | | | 126/39 BA |
| 2014/0113039 A1* | 4/2014 | Barkhouse | G01F 23/20 |
| | | | 73/296 |
| 2015/0208858 A1* | 7/2015 | Robbins | A47J 27/002 |
| | | | 426/231 |
| 2016/0051078 A1 | 2/2016 | Jenkins et al. | |
| 2017/0205076 A1* | 7/2017 | Cadima | F24C 3/126 |
| 2017/0223772 A1* | 8/2017 | Shingler | F24C 15/105 |

FOREIGN PATENT DOCUMENTS

| | | | |
|---|---|---|---|
| CN | 21644432 U * | 4/2022 | |
| DE | 102009001934 A1 * | 9/2010 | ............ F24C 7/083 |
| JP | 5793350 B2 * | 10/2015 | ............ F24F 11/006 |
| KR | 20130143295 A * | 1/2006 | |
| RU | 2651734 C2 * | 4/2018 | ............ F24C 3/124 |

* cited by examiner

COOKING APPLIANCE WITH PROGRAMMABLE ZONE PROFILES

CROSS-REFERENCE TO RELATED APPLICATIONS

This application claims priority to U.S. Provisional Patent Application Ser. No. 62/628,569, entitled GRILL WITH PROGRAMMABLE ZONE PROFILES, filed Feb. 9, 2018, which are incorporated herein by reference.

BACKGROUND

A temperature sensor, such as a thermocouple, can register a temperature in an environment and emit a signal indicative of a measured temperature. For example, a thermocouple can be used generate a temperature-dependent voltage that is interpreted to measure temperature. In applications, other design considerations of a system may influence placement of a temperature sensor in the system. For example, in a barbecue grill, a sensor may be mounted within the cooking space of the grill to measure a temperature therein, but it is typically positioned on or adjacent to a wall of the space. In some situations, a temperature recorded at the wall of the cooking space is useful. Often the temperature at or near the cooking location (e.g. temperature at a cooking surface) is desirable.

SUMMARY

A simplified summary is provided herein to help enable a basic or general understanding of various aspects of exemplary, non-limiting embodiments that follow in the more detailed descriptions and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In one implementation, a temperature display system for a grill can comprise a set of one or more control knobs respectively for controlling the output of a different heating element of the grill. The respective knobs in the set can be assigned to a zone in the grill, and the respective knobs in the set comprising an indicator to display a temperature indication. Further, the system can comprise a set of temperature sensors for registering a temperature and outputting a raw temperature signal indicative of a raw sensed temperature. The respective temperature sensors can be paired with a different knob of the set of control knobs and associated with a corresponding zone of the grill. Additionally, the system can comprise a controller that is configured to receive a raw temperature signal from a temperature sensor and determine a temperature at a desired temperature reading location in the associated zone based at least on the raw temperature signal and a temperature profile selected for a configuration in the associated zone. The controller can be configured to output an actual temperature signal to the indicator on the knob for the associated zone to output the temperature indication for the associated zone.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, empirical data can be collected and analyzed to determine a relationship between a sensor reading and an actual temperature at a desired location in a cooking apparatus. For example, the sensor reading can be subsequently interpreted based on the identified relationship to provide an appropriate output. In order to configure the sensor reading and desired output for different and varied conditions, extensive data collection and relationship identification can be performed. The collected data can subsequently be used to convert a sensed temperature into an actual temperature, which may be used to provide temperature indication to a user. That is, for example, based on conditions in a cooking space, it may not be appropriate (e.g., desired, practical, or feasible) to place a sensor at a location where a temperature reading is desired (e.g., by the user). In this example, empirical testing can identify the actual temperature at the desired cooking location in the cooking space, and further identify the relationship (e.g., function) between the actual temperature and a temperature sensed at a different (e.g., appropriate) location.

In various, non-limiting embodiments, a temperature display system can provide individual temperature measurements and indications of actual temperatures for a plurality of locations and/or zones of a cooking grill or other cooking appliance (e.g., cooker, smoker, barbeque, oven, etc.). In one implementation, each zones of the cooking grill or cooking appliance can be associated with or linked to a control knob (e.g., or other controller), one or more sensors, and a temperature display device.

As an example, a relationship (e.g., described by a function) between a measured (e.g., sensed) temperature at a particular sensor (e.g., first sensor) and a zone temperature at a cooking surface (e.g., grate), generally at a center of the zone, may be dependent on the configuration of the zone. In one implementation, a temperature profile (e.g., a first temperature profile) that corresponds to the configuration of the zone (e.g., a first configuration) can be selected for the zone (e.g., a first zone). In this implementation, the selected temperature profile can comprise the relationship (e.g., function, algorithm, equation, etc.) between a measured temperature and the actual temperature at the desired cooking location (e.g., at the grate surface in the general center of the zone).

In this implementation, for example, the selected temperature profile, corresponding to the configuration of the zone, may be utilized by a controller (e.g., a processor or processing unit) to convert a sensed (e.g., raw) temperature, provided by the sensor, to the zone temperature which can be indicated by the temperature display. In one implementation, the temperature profile can be selectable from a plurality of temperature profiles that are stored in a memory associated (e.g., communicatively coupled) with the controller. Accordingly, for example, the temperature display system can comprise a display device (e.g., colored indicators, display screen, or similar), which can readily indicate a substantially accurate zone temperature for a variety of zone configurations through the selection of an appropriate profile for an indicated zone configuration.

As an illustrative example, a controller (e.g. comprising a processor on a control board) can be programmed to respond to a temperature sensor (e.g., thermocouple) signal to provide a temperature for a point (e.g., cooking location) located some distance away from the sensor. In this example, as described above, when the cooking appliance is provided with a different system configuration, the controller can utilize a function stored in local memory (e.g., on the control board, or on a separate component) that corresponds to the different system configuration for the cooking appliance. In this way, for example, the controller can be reprogrammed with the appropriate function for the configuration that describes the relationship between the sensor and desired cooking location (e.g., grate). The controller, in this example, can provide a calculated temperature for the desired location based on the sensed temperature and the chosen function.

As one example, in a grill (e.g., barbeque, smoker, cooker) system, a thermocouple, or other temperature sensor, can be mounted in variety of places, such as behind a burner knob, on a lid, etc. When grilling, however, it is generally desirable to identify the temperature at the top of the grate above an approximate center of a burner. As described above, a relationship between a thermocouple reading and an actual temperature at the grate center can be empirically determined and represented as a function (e.g., equation, formula, etc.). As an example, other configurations of the grill or additional components introduced into the system can alter the environment sufficiently that would alter the empirically derived relationship.

In accordance with one or more aspects, a temperature display system provides one or more temperature sensors respectively associated with different zones of a device, such as a grill. The temperature display system can be versatile and readily configurable for use in devices having varying configurations, sizes, and/or components. In one implementation, the temperature display system can comprise a set of temperature sensors respectively associated with one or more of a plurality of zones, a set of knobs for controlling heating elements respectively associated with each zone, and a controller for controlling a temperature display associated with respective knobs based on sensed temperatures acquired by respective temperature sensors for each zone. Thus, for example, the temperature display system can provide an indication of an individual temperature for each zone. In one implementation, to enable deployment in a variety of environments, the temperature display system may also include a memory coupled with the controller. In one implementation, the memory can store a plurality of zone profiles individually selectable for each knob/sensor pair.

As an illustrative example, a grill (e.g., cooker, smoker, barbeque, oven, or the like) may comprise one or more heating elements, such as a burner producing a flame, or an electrical resistance-based heating element. In some implementations, in this example, respective heating elements can be arranged separately from each other and configured to provide heat to a separate, associated zone (e.g., or each zone can have two or more burners working together to heat their associate zone). For example, a grill could comprise two (e.g., three, four, etc.) burners disposed below a cooking grate (e.g., where food can be placed and cooked). In this example, each burner can produce flame to heat a zone disposed directly above the burner. Therefore, the example grill can comprise a first burner heating a first zone, a second burner heating a second zone, etc. (e.g., a third burner heating a third zone, and so-on).

Further, in this example, respective zones can comprise one or more temperature sensors; therefore, a first sensor can be disposed in a first zone, a second sensor can be disposed in a second zone, etc. (e.g., a third sensor in a third zone, and so-on). In one implementation, in this example, the respective one or more sensors can be engaged with (e.g., in/on) the grill, disposed at a location that is remote from the desired temperature reading location. For example, the desired temperature reading location can comprise the top surface (e.g., food cooking location) of the central portion of the grate above respective burners in each zone.

That is, a first sensor can be disposed in first temperature sensing location of a first zone of the cooking appliance, and first desired temperature reading location can be located proximate a first top surface of the central portion of a first food cooking location above a first burner; wherein the first temperature sensing location is a different location in the first zone than, and remote from, the first food cooking location. Additionally, in this example, a second sensor can be disposed in second temperature sensing location of a second zone of the cooking appliance, and a second desired temperature reading location can be located proximate a second top surface of the central portion of a second food cooking location above a second burner; wherein the second temperature sensing location is a different location in the second zone than, and remote from, the second food cooking location (e.g., and similarly with a third, fourth, etc.).

In one implementation, a relationship (e.g., function) between the temperature at the sensor location and the desired temperature reading location, for the respective zones of the cooking appliance, can be identified (e.g., empirically). As an illustrative example, in the first zone, the temperature at the first temperature sensing location (e.g., where the sensor is located) may be temperature $A^1$ (e.g., 200° C., 392° F.) and the temperature at the first desired temperature reading location (e.g., cooking location) may be temperature $B^1$ (e.g., 150° C., 302° F.). The relationship between the temperature $A^1$ and temperature $B^1$ can be identified, such as by identifying a range of temperatures for the respective locations and determining a function $F^1$ that represents this relationship. In this implementation, in one example, a function $F^2$ can be similarly identified for the second zone, using the relationship between temperature $A^2$ at the second temperature sensing location and a temperature $B^2$ at the second desired temperature reading location (e.g., and similarly a function $F^3$ for the third zone, etc.). In this way, for example, a function $F^x$ can be identified for the respective zones in the cooking appliance.

In one aspect, a cooking appliance can comprise a plurality of configurations for one or more of the cooking zones. As an illustrative example, a first configuration for a grill may be a basic set up comprising merely a grate disposed over the first heating element in an open cooking compartment (e.g., a grill with a grate and lid forming the cooking compartment). In this aspect, a second configuration can comprise additional or different components added to or removed from the first configuration. As an example, the basic burner may be switched out with a different burner that provides different heating characteristics to the zone; a heating/cooking shelf may be added to the zone, adding an additional heating/cooking surface; a rotisserie apparatus could be added to the zone; a smoker tray can be added to the zone; a different type of cooking surface (e.g., grate) could be added to the zone; or other components used for cooking may be added to the zone. In this aspect, the addition, switching, removal, or otherwise rearrangement of components may alter the temperature relationship (e.g., function $F^x$) for the zone. Additionally, a different desired temperature reading location (e.g., cooking location) may be implemented with the addition of different components (e.g., rotisserie, cooking shelf, smoker shelf, etc.).

In one implementation, a specific profile can be provided for respective configurations available for respective zones in the cooking appliance, where the profile is matched to the particular configuration of the zone. That is, for example, a relationship (e.g., function) between the temperature at the sensor location in the zone and the desired temperature reading location in the zone, for the respective configurations of the zone in the cooking appliance, can be identified (e.g., empirically). As described above, a range of temperatures can be identified for each available configuration for each zone, and a corresponding function can be determined for each configuration. Therefore, for example, the first zone may have function $F1^1$ for a first configuration in the first zone, a function $F2^1$ for a second configuration in the first zone, a function $F3^1$ for a third configuration in the first zone, and so-on for each of the available configurations for the first zone. In this example, function $F1^1$ may represent the relationship between a temperature $A^1$ at the first temperature sensing location and a temperature $B1^1$ at the first desired temperature reading location in the first configuration; function $F2^1$ may represent the relationship between a temperature $A^1$ at the first temperature sensing location and a temperature $B2^1$ at the second desired temperature reading location in the second configuration; and so-on for respective configurations.

It should be noted that, in some configurations, the second desired temperature reading location in the second configuration may be the same as the second desired temperature reading location in the first configuration. For example, the second configuration may comprise changing a first burner from the first configuration to a second, different, burner in the second configuration. In this example, the second desired temperature reading location in the second configuration will be the same as the second desired temperature reading location in the first configuration. Alternately, in some configurations, the second desired temperature reading location in the second configuration may be a different location than the second desired temperature reading location in the first configuration. For example, the second configuration may comprise adding a rotisserie to the first configuration, as a second configuration. In this example, the second desired temperature reading location in the second configuration will be a different location (e.g., the location of the rotisserie) than the second desired temperature reading location in the first configuration.

Thus, in one implementation, a plurality of profiles can be created for a cooking appliance, where respective profiles comprise a function indicative of a relationship between a temperature sensing location and a desired temperature reading location. Further, the respective profiles are particular to a particular configuration in a particular zone of the cooking appliance. That is, respective profiles can provide a particular programmed response, based on the function, to a signal from a temperature sensor in order to determine an actual temperature at a desired temperature reading location based on the signal. A profile can be associated with a specific zone of a grill having a particular configuration or installed components. For example, each zone of the grill can be associated with a respective burner controllable with an associated control device (e.g., appliance knob or button) and measured with an associated temperature sensor. In this example, a sensed temperature in a zone will be dependent on a configuration of the zone. Therefore, for example, respective zones (e.g., first zone, second zone, etc.) can have a first zone profile, a second zone profile, and so-on, depending on the number of configurations available for that zone.

As an example, the temperature attributes at a sensor location can vary for the zone depending on a type of burner (e.g. infrared ceramic burner, tube burner, sear burner, etc.) installed at the zone. In addition, other features such as a smoker tray or type of grill surface can alter the temperature characteristics registered by the temperature sensor. In one example, in order to identify the temperature at a central portion of a grate in the zone, a particular profile can be assigned to the zone that corresponds to the specific configuration of the zone. Thus, by changing a profile assigned to the zone, the same controller and temperature sensor can determine a temperature at a desired temperature reading location in the zone even when a different burner (e.g., or other component) is installed, or other features (e.g. grills, rotisseries, or trays) are swapped in and out of the system.

In one implementation, a plurality of profiles can be stored in local (e.g., local to the cooking device) memory. In one implementation, a particular cooking appliance may be configured to have a set of configurations for respective zones in the cooking appliance. In this implementation, respective configurations for respective zones, can have an associated profile, comprising a set of profiles for the cooking appliance. Further, the set of profiles for the cooking appliance can be stored in the local memory for the cooking appliance. Further, in one implementation, the local memory can be communicatively coupled with a controller, which can comprise a processing component (e.g., a computer processor). In this implementation, the appropriate profile, corresponding to the configuration selected for the zone, can be selected and the processing component can use the loaded profile to determine the temperature at the desired temperature reading location based on this profile.

According to another aspect, the temperature display system can comprise an indicator for respective zones, which can inform an appliance operator of the respective temperatures at the desired temperature reading locations, of each zone. For example, a liquid crystal display (LCD), LED display, seven-segment display, or other appropriate display, can output a numeric (e.g., or other appropriate) representation of the temperature of a zone as determined by the controller, based on a sensor signal and an assigned profile. In another embodiment, the control device (e.g., appliance knob or button), used for controlling the cooking element (e.g., burner) of its associated zone, can include one or more multi-color LEDs to visually indicate the temperature, such as by using different colors associated with respective temperature ranges.

For example, the LED can illuminate with a variety of colors such as blue (e.g., cool temperature range), yellow (e.g., warm temperature range), orange (e.g., moderately hot temperature range), and red (e.g., very hot temperature range) to indicate the temperature of the zone. According to one exemplary encoding, a zone temperature of approximately 140° F. or less can be indicated by illuminating the LED in blue; a zone temperature greater than 140° F. and less than 375° F. can be indicated by yellow; a temperature between 375° F. and 475 can be indicated with orange; and a zone temperature greater than 475° F. can be indicated by red. It should be appreciated that other color, encodings, or ranges can be employed. For example, the displayed color can indicate ranges typically associated with low heat, medium heat, and high heat, respectively, so as to align with common terminology utilized in recipes.

In one implementation, respective zones can be associated with a control device (e.g., appliance knob, buttons, touch screen selector, etc.). That is, for example, the temperature for a first zone can be controlled by a first control device. In this example, the first control device may control a heat output of the first heating element in the first zone (e.g., and a second control device may control the heat output of the second heating element in the second zone, etc.). In this implementation, each zone in the cooking appliance can have a control device that controls the temperature of that zone. Further, as each zone can comprise one or more temperature sensors for detecting a temperature in that zone, and a control device, each zone can comprise a sensor-control device pair.

In yet another aspect, selecting a desired profile may be performed in different ways. For example, a central input device (e.g., comprising a touch pad, touch screen, buttons, dials, etc.) can be used to select or input the desired profile based on the configuration for the target zone, for each of the zones in the cooking appliance. In one implementation, respective zones in the cooking appliance may be associated with an associate zone profile selection input device, which can be used to select the desired profile for the associated zone. As an example, the zone profile selection input device can be used to select the appropriate profile (e.g., according to the configuration in the zone) for the zone. In this way, for example, the temperature at the desired temperature reading location will be accurate based on the function associated with the selected profile.

In one aspect, the controller for the cooking appliance can be placed into a program or selection mode. In one implementation, an appropriate profile (e.g., stored in memory, and based on the zone configuration) can be assigned to respective zones, which can be linked to the associated control device/sensor pair. In one implementation, the zone profile selection input device may be part of or controlled by the control device for the zone. In this implementation, for example, respective profiles for the zone can be reviewed (e.g., scrolled through) using the control device (e.g., the knobs), and the appropriate profile can be selected while in the program mode.

In one implementation, a controller can be installed in any cooking appliance that comprises the one or more zones and configurations associated with the known profiles. In this implementation, for example, through a selection of an appropriate profile for respective zones, that is stored in memory, the controller can convert the sensed temperature from the temperature sensor disposed in the zone to provide a zone temperature at the desired temperature reading location (e.g., cooking location).

Figure 1A:
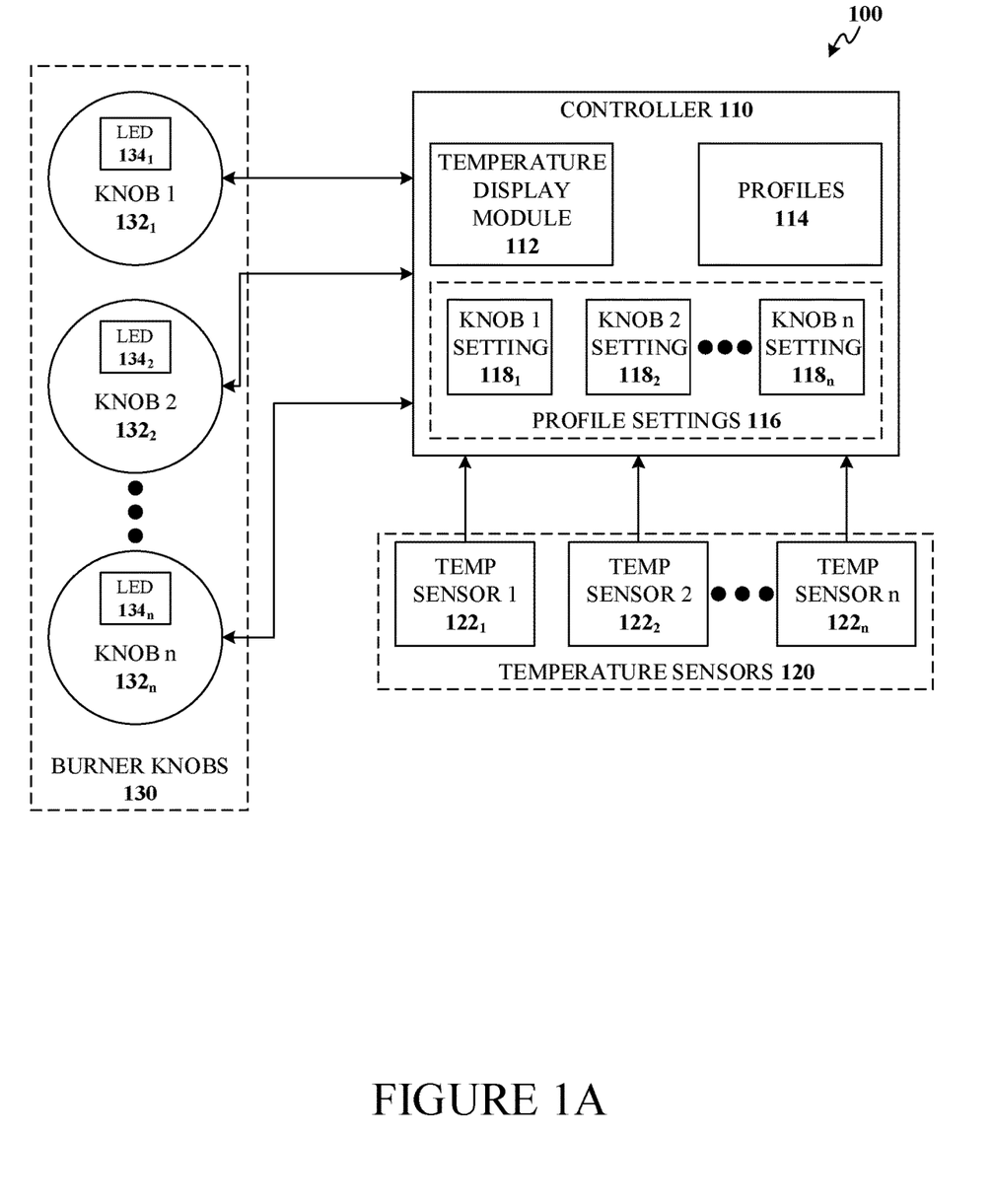
FIGS. 1A and 1B are component diagrams that schematically illustrate an exemplary, non-limiting embodiment of a temperature display system in accordance with various aspects.
Figure 1B:
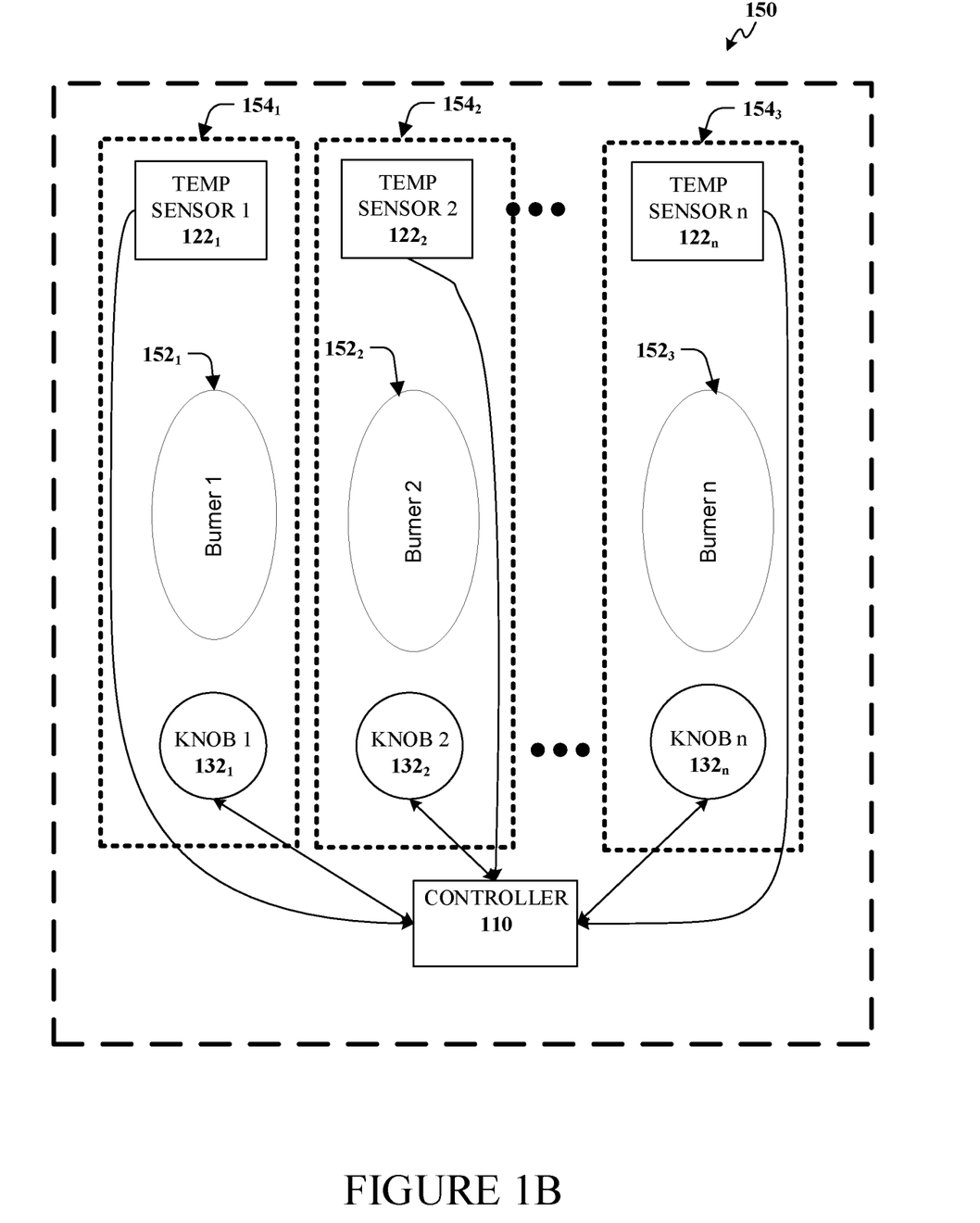

Referring now to the figures, FIGS. 1A and 1B illustrates an exemplary, non-limiting embodiment of a temperature display system. As shown in FIGS. 1A and 1B, system 100 comprises a controller 110, a set of temperature sensors 120, and a set of control devices 130 (e.g., burner knobs), which can be installed in a cooking appliance 150, such as a grill or similar appliance. The respective control devices 130 can be used to control desired heating to associated zones 154 of the cooking appliance. As an example, a grill can have n zones $154_1$, $154_2$, $154_n$ where n is any integer greater than or equal to one. Accordingly, the set of temperatures sensors 120 can include temperature sensors $122_1$, $122_2$, ..., $122_n$ and the set of control devices 130 (e.g., burner knobs) can include control device $132_1$, $132_2$, ..., $132_n$. In one aspect, each sensor 122 can be paired or linked with one control device 130, and the linked pair can be respectively associated with a zone 154 of the grill 150. As an example, the knob $132_n$ can control a burner $152_n$, of burners $152_1$, $152_2$, $152_n$, associated with zone $154_n$ of the grill and sensor $122_n$ can obtain a temperature reading for zone $154_n$. Further, each knob 132 can include one or more LEDs 134, which can illuminate with a particular color to indicate a temperature of the respective zone.

As described above, the sensor 122 provides a sensed (e.g., raw) temperature reading associated with a temperature at the sensor's location. As an example, an operator of the grill may be interested in the temperature at a central portion (e.g., or other surface cooking location) of the zone (i.e. a grate temperature at the center). The controller 110 can be configured to obtain a signal (e.g., indicative of the sensed temperature) from the sensor 122, which can be a thermocouple or other temperature sensor, and interpret the signal to determine a zone temperature (e.g., the temperature at the desired temperature reading location).

A relationship between the sensor's temperature reading and the actual zone temperature at the desired temperature reading location can vary, for example, based on a type of burner installed in the zone, and whether or not other components, such as a smoker tray or rotisserie, are present in the zone. As described above, this relationship can be experimentally determined (e.g., empirically). A plurality of relationships described as a function in a profile, can represent each configuration in each zone respectively (e.g., a particular choice and arrangement of burner and other components). These profiles can be determined and stored as respective profiles on a memory 114 of controller 110. According to one or more examples, the memory can be a non-volatile memory such as a flash memory, a ROM (EEPROM or the like), or other medium suitable to persistently store profiles.

In this implementation, the memory 114 of controller 110 can additional store profile settings 116 which includes knob settings $118_1$, $118_2$, ..., and $118_n$ respectively associated with each zone $154_1$, $154_2$, ..., and $154_n$ (or knob/sensor pair). The knob setting 118 specifies a profile of profiles 114 selected for the respective zones 154. For example, knob setting $118_1$ indicates the profile associated with $154_1$ that is controlled by knob $132_1$ and measured by temperature sensor $122_1$.

In this implementation, the knob setting 118 can enable a temperature display module 112 of the controller 110 to select an appropriate profile from profiles stored in memory 114 in order to process a sensed (e.g., raw) temperature reading signal from sensor 122. For example, the controller 110 receives sensed temperature reading signal from sensor 122, which indicates a temperature at the location of the sensor 122. Based on the corresponding profile indicated by a selection, such as using a knob setting 118, the controller 110 can use the stored profile (e.g., as a function) to determine the temperature at the desired temperature reading location, in the zone 154. In this example, the temperature display module 112 can output a signal to LED 134 of knob 132 to illuminate the LED 132 with a color encoded for the identified temperature at the desired temperature reading location.

As an illustrative example, each profile can be a temperature curve or curves that relate a raw sensor temperature (e.g., the sensed temperature) to an actual zone temperature (e.g., the desired temperature reading location). As an example, each curve can be empirically determined through data collection on test configurations corresponding to zone configuration associated with each profile. The curves can be stored as look-up tables on the memory 114 of the controller 110 such that the controller 110 converts the raw temperature to an actual zone temperature, such as by querying the appropriate look-up table. In another embodiment, the relationship can be encoded (e.g., stored) as a function that is executed by the controller 110 to adjust a raw temperature to an actual zone temperature. In this example, profiles stored 114 can respectively specify a set of parameter values input to the function to accurately convert the temperature based on the zone configuration.

Figure 2A:
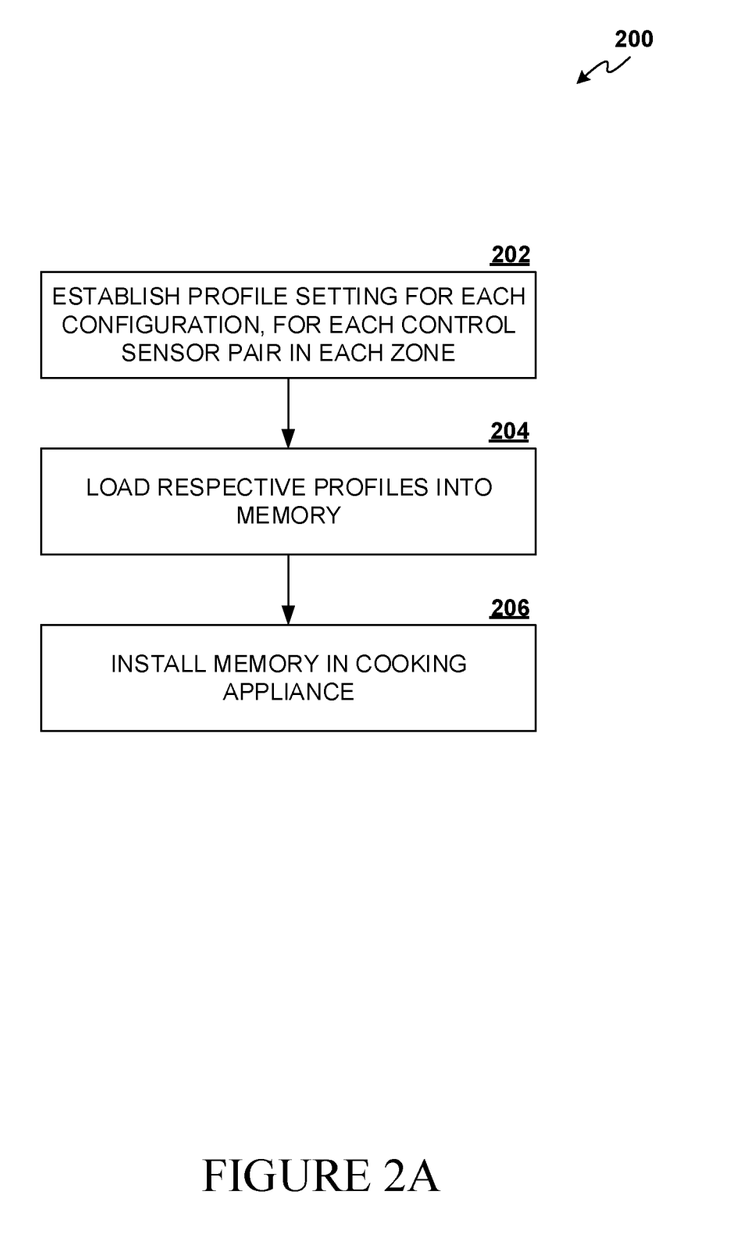
FIGS. 2A and 2B are flow diagrams that illustrates exemplary, non-limiting embodiments of a temperature display methods according to one or more aspects.

FIG. 2A is a flow diagram illustrating an exemplary, non-limiting embodiment of a temperature display method 200. In this embodiment, method 200 begins at reference numeral 202, where an individual profile setting is respectively established for each configuration available in each zone (e.g., each control device/sensor pair). As described above, a profile can encode a relationship (e.g., as a curve or function) between a desired temperature reading location (e.g., actual zone temperature at target cooking location) and a sensed temperature (e.g., raw temperature) detected by a sensor mounted in or proximate the zone.

In this implementation, at 204, respective profiles can be loaded into memory resident in the system, as described above. As an example, respective profiles for a cooking appliance can be pre-loaded in memory (e.g., coupled with or disposed in the controller) as a default. In another implementation, one or more profiles can be added and/or updated in memory, such as when a new configuration is added or a configuration is changed. As an example, the memory (e.g., or controller) can be communicatively coupled with a remote server (e.g., wirelessly or coupled with a connecting wire), and new or updated profiles can be loaded into memory. Further, in one implementation, firmware can be added or updated into memory in a similar manner.

At 206, the memory (e.g., and controller) can be installed in a cooking appliance. In one implementation, a central controller coupled with or comprising the memory pre-loaded with profiles, may be installed, and can be used to control profiles and temperature readings in all of the zones in the cooking appliance. In another implementation, respective zones can comprise (e.g., be linked with) a separate controller that is coupled with or comprising the memory pre-loaded with profiles for that zone.

Figure 2B:
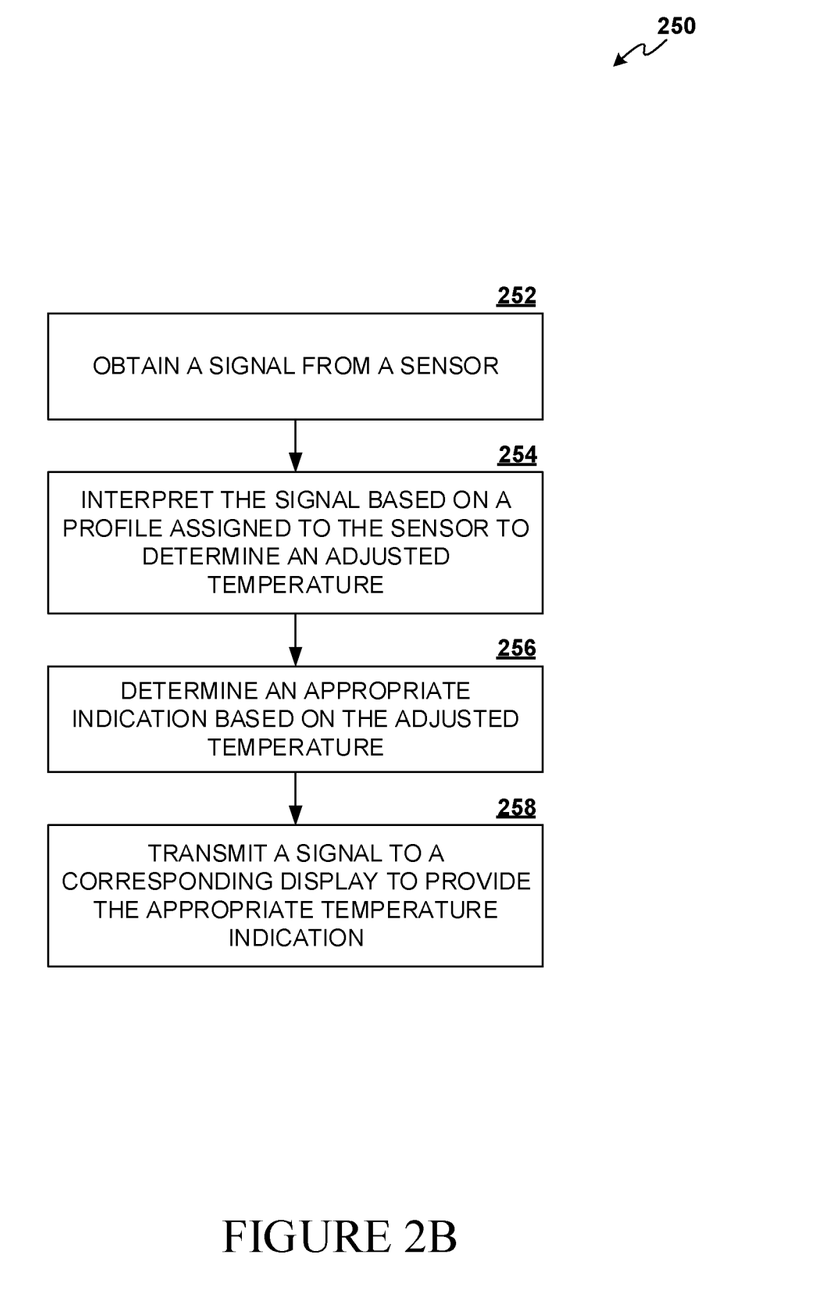

FIG. 2B is a flow diagram illustrating an exemplary, non-limiting embodiment of a temperature display method 200 for a cooking appliance. Method 200 can be implemented, for example, by system 100 described above in connection with FIG. 1. At 252, a signal indicative of a sensed/raw temperature detected at a sensor in a zone is obtained from the sensor. At 254, the temperature signal, indicative of the sensed/raw temperature, is used to convert the sensed/raw temperature to a temperature at the desired temperature reading location, based at least on a profile that is assigned to the zone monitored by the sensor.

As an example, using the profile stored in memory, an adjusted temperature is determined that corresponds to an actual zone temperature at the cooking location in the selected configuration for that zone. In one implementation, a processor disposed in the controller can receive data indicative of the temperature signal, which can also comprises a selected configuration and zone identifier. In this example, the processor can call to memory and use the configuration and zone identifier to identify the appropriate conversion information (e.g., function, curve, data from a look-up table, etc.) to convert/adjust the temperature indicated by the temperature signal into data indicative of the temperature at the cooking location in the zone.

At 208 in FIG. 2B, an appropriate temperature indication can be determined based on the adjusted temperature, which is indicative of the temperature at the desired temperature reading location for the zone. For example, the temperature indication can be a color encoding associated with the adjusted temperature, a continuously windowed average that is updated with the adjusted temperature, and/or a numeric encoding of the adjusted temperature.

At 210, a signal is transmitted to a communicatively coupled display for the zone to display the indication of the temperature. In one implementation, a central display may be used for respective zones, such as a screen, digital display, or the like, that can indicate the temperature and the zone associated with the temperature. In another implementation, respective zones may comprise separate displays, such as digital display, colored light indicators, screens, and the like. For example, a control device can comprise a knob used to control the heat to the zone. In this example, the knob can comprise a set of light indicators, such as LEDs, that are configured to display various color combination indicative a zone temperature. Further, the knob can include a segmented multi-color LED, an LCD display, a seven-segment display, or other visual output device. The signal indicative of the adjust temperature that is transmitted from the controller can drive the display output device associated with the knob to output the indication of the zone temperature, such as using a color coded display.

Figure 3:
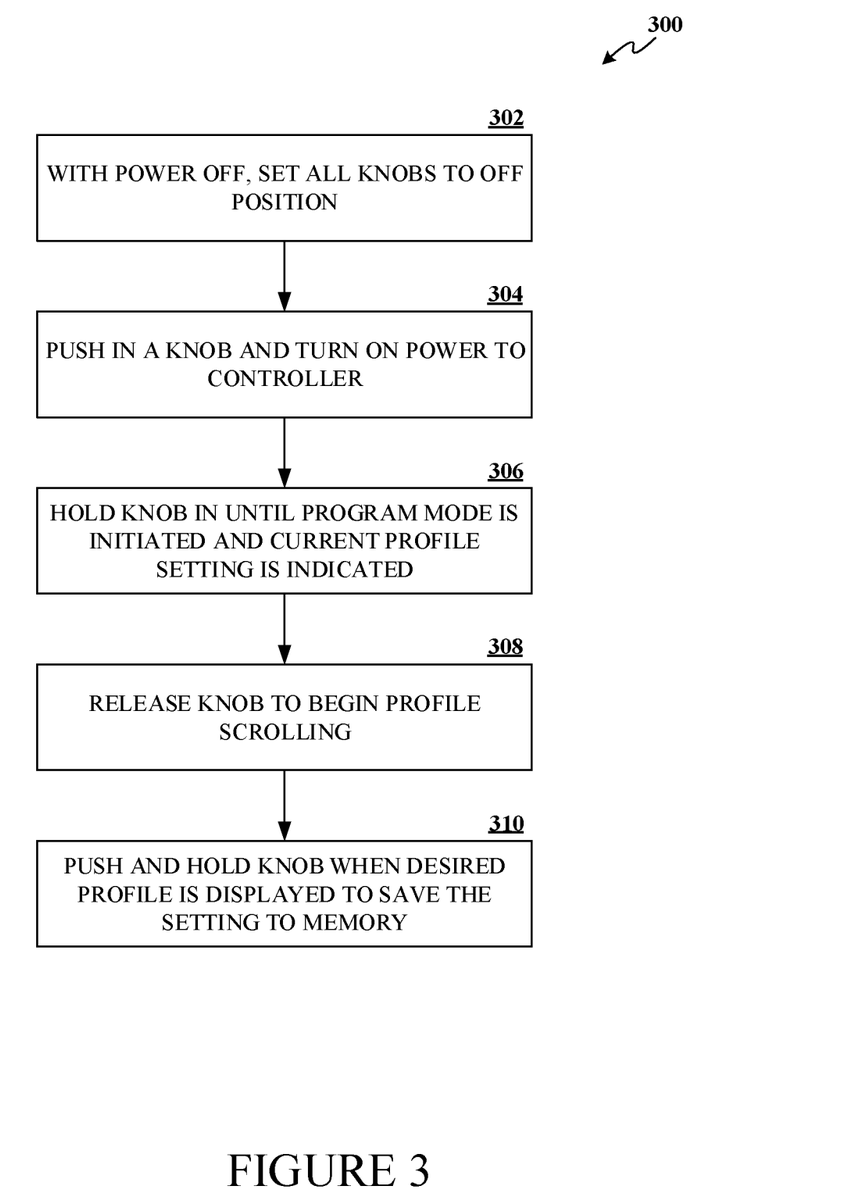
FIG. 3 is a flow diagram that illustrates an exemplary, non-limiting embodiment of a profile selection method according to one or more aspects.

FIG. 3 is a flow diagram illustrating an exemplary, non-limiting embodiment of a profile selection method 300. As an example, the exemplary method can be implemented with system 100 of FIG. 1 to assign profiles for each zone of a cooking appliance system 100 (e.g., grill housing system) based on respective zone configurations. At 302, with controller power off, respective control devices (e.g., knobs) of the cooking appliance can be set to an off position. At 304, a control device corresponding to a target zone can be set to an action position (e.g., by pushing the knob in), and power to the controller is provided (e.g., turned on). In this implementation, the control device can be maintained in the action position (e.g., held in), at 306, at least until a program (e.g., selection) mode is initiated and a current profile for the zone is indicated (e.g., on a display). At 308, the control device can be released from the action position, which can instruct the controller to scroll through available profiles. At 310, when a desired profile is indicated, the knob can be, again, set to the action position (e.g., pushed and held in) at least until the selected profile is saved to memory thereby assigning the profile to the zone.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is to be appreciated that various features or aspects of the embodiments described herein can be utilized in any combination with any of the other embodiments.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean "serving as an illustration or example of something."

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A temperature display system for a grill, comprising:
   a set of one or more control knobs respectively for controlling the output of different heating elements of the grill, respective knobs in the set assigned to a zone in the grill, respective knobs in the set comprising an indicator to display a temperature indication;
   a set of temperature sensors for registering a temperature and outputting a raw temperature signal indicative of a raw sensed temperature, respective temperature sensors paired with a different knob of the set of control knobs and associated with a corresponding zone of the grill; and
   a controller configured to receive a raw temperature signal from a temperature sensor, determine a temperature at a desired temperature reading location in the associated zone based at least on the raw temperature signal and a temperature profile selected for a configuration in the associated zone; and configured to output an actual temperature signal to the indicator on the knob for the associated zone to output the temperature indication for the associated zone.

2. The system of claim 1, wherein the temperature sensor is a thermocouple that outputs a voltage signal indicative of a temperature measured at a location of the thermocouple.

3. The system of claim 1, the controller comprising memory storing a plurality of temperature profiles, respective temperature profiles indicative of a relationship between predetermined raw sensed temperature at a sensor location and a predetermined temperature at a desired temperature reading location for a different zone configuration.

4. The system of claim 3, respective temperature profiles comprising a function that outputs the temperature at a desired temperature reading location for the associated zone configuration when the temperature indicated by the raw temperature signal is input to the function.

5. The system of claim 3, wherein the zone configuration is determined based on a type of burner and a set of grill components disposed in the zone.

6. The system of claim 1, wherein the controller is further configured to select a temperature profile for each zone from a plurality of temperature profiles stored in a memory, wherein the profile selected corresponds to a configuration of the zone.

7. The system of claim 1, wherein the temperature profile is a look-up table employed by the controller to convert the raw temperature sensed by the temperature sensor to the actual zone temperature in the zone.

8. The system of claim 1, wherein the desired temperature reading location corresponds to a cooking location in the associated zone, where food is located for cooking.

9. The system of claim 1, wherein the desired temperature reading location comprises a central portion of a grate disposed in the associated zone of the grill.

10. The system of claim 1, wherein the indicator is a multi-color LED and the actual zone temperature is encoded as a color shown by the LED.

11. A system for controlling temperature in a cooking apparatus, comprising:
    one or more temperature sensors respectively disposed proximate to a cooking location to output a sensed temperature signal indicative of a sensed temperature;
    a controller receiving respective sensed temperature signals from the one or more temperature sensors, converting respective sensed temperature signals to a zone temperature signal indicative of a zone temperature based at least upon a zone profile, a zone temperature indicative of an actual temperature for a zone cooking location; and a temperature indicator converting respective zone temperature signals to a visual indication of the zone temperature.

12. The system of claim 11, the respective one or more temperature sensor disposed remotely from the zone cooking location in which they are disposed.

13. The system of claim 11, the zone profile comprising an indication of a relationship between temperature at a location of the temperature sensor and the temperature at the zone cooking location for the zone in which the temperature sensor is disposed.

14. The system of claim 13, respective zones comprising a first zone profile and a second zone profile, the first zone profile associated with a first zone configuration for the zone, and the second zone profile associated with a second configuration for the zone.

15. The system of claim 14, the first zone configuration comprising a first burner and a first cooking location, the second zone configuration comprising a second burner and a second cooking location.

16. The system of claim 1, the controller comprising memory storing a plurality of zone profiles, respective profiles corresponding to a target zone with a target configuration.

17. The system of claim 16, the respective profiles stored as data indicative of one of:
a function that describes the relationship between the temperature at a location of the temperature sensor and the temperature at the zone cooking location;
a curve that indicates the relationship between the temperature at a location of the temperature sensor and the temperature at the zone cooking location;
an equation that determines the relationship between the temperature at a location of the temperature sensor and the temperature at the zone cooking location; and
a look-up table that identifies the relationship between the temperature at a location of the temperature sensor and the temperature at the zone cooking location.

18. The system of claim 11, installed in a barbeque grill apparatus.

19. A method for making a cooking appliance that display the temperature of a cooking location in a cooking zone based on a temperature reading from a remote sensor in the cooking zone, comprising:
identifying a zone profile for each zone configuration for each cooking zone of the cooking appliance, identifying the zone profile comprising determining a relationship between a temperature at a temperature sensor and a temperature at a cooking location in the zone;
storing respective zone profiles in memory, resulting in pre-loaded memory;
installing the pre-loaded memory in the cooking appliance;
installing a processor in communication with the memory, the processor receiving data indicative of temperature from zone temperature sensor, identifying the zone configuration for the zone from which the data indicative of temperature from zone temperature sensor is received, identifying the appropriate profile from the memory that corresponds to the zone configuration, and converting the data indicative of the temperature at the temperature sensor to data indicative of the temperature at a cooking location in the zone using the identified zone profile; and
installing a temperature indicator, the temperature indicator visually displaying an indication of the temperature based at least on the data indicative of the temperature at a cooking location in the zone.

20. The method of claim 19, the installing the memory, processor and temperature indicator in the cooking appliance comprising installing the memory, processor and temperature indicator in a grill comprising a first knob for controlling the temperature of a first zone, wherein a first temperature indicator is disposed in the first knob; and installing a first temperature in this first zone.

* * * * *